(12) United States Patent
Takei et al.

(10) Patent No.: US 11,616,236 B2
(45) Date of Patent: Mar. 28, 2023

(54) BINDER, METHOD OF PREPARING THE SAME, ELECTRODE FOR SECONDARY BATTERY INCLUDING THE BINDER, AND SECONDARY BATTERY INCLUDING THE ELECTRODE

(71) Applicants: Samsung Electronics Co., Ltd., Suwon-si (KR); Samsung SDI Co., Ltd., Yongin-si (KR)

(72) Inventors: Koichi Takei, Hwaseong-si (KR); Woojin Bae, Yongin-si (KR); Kanghee Lee, Suwon-si (KR); Seongho Jeon, Yongin-si (KR); Heechul Jung, Gunpo-si (KR); Sungsoo Han, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 592 days.

(21) Appl. No.: 16/599,343

(22) Filed: Oct. 11, 2019

(65) Prior Publication Data

US 2020/0119356 A1    Apr. 16, 2020

(30) Foreign Application Priority Data

Oct. 12, 2018    (KR) .......................... 10-2018-0122036

(51) Int. Cl.
*C08F 216/06*  (2006.01)
*H01M 4/62*  (2006.01)
*H01M 4/1393*  (2010.01)
*H01M 10/0569*  (2010.01)
*H01M 10/0525*  (2010.01)
*C08F 220/06*  (2006.01)
*H01M 4/36*  (2006.01)

(52) U.S. Cl.
CPC .......... *H01M 4/622* (2013.01); *C08F 216/06* (2013.01); *C08F 220/06* (2013.01); *H01M 4/1393* (2013.01); *H01M 4/364* (2013.01); *H01M 10/0525* (2013.01); *H01M 10/0569* (2013.01)

(58) Field of Classification Search
CPC ............................ C08F 216/06; C08F 220/06
See application file for complete search history.

(56) References Cited

U.S. PATENT DOCUMENTS

| | | | | |
|---|---|---|---|---|
| 5,710,227 | A * | 1/1998 | Freeman .................. | C08F 20/04 526/216 |
| 6,624,205 | B2 * | 9/2003 | Muranaka ................ | B01J 39/20 521/25 |
| 8,097,345 | B2 * | 1/2012 | Hakamata ............. | C08L 51/003 427/372.2 |
| 9,318,743 | B2 | 4/2016 | Chung et al. | |
| 9,908,961 | B2 * | 3/2018 | Kaneshima ............... | C08F 2/38 |

(Continued)

FOREIGN PATENT DOCUMENTS

| KR | 1119801 B1 | 3/2012 |
|---|---|---|
| KR | 1746894 B1 | 2/2014 |

(Continued)

*Primary Examiner* — Amanda C. Walke
(74) *Attorney, Agent, or Firm* — Cantor Colburn LLP

(57) ABSTRACT

A binder including a metal salt of a graft copolymer, which is a polymerization product of polyvinyl alcohol, an ethylenically unsaturated carboxylic acid, and a polymerizable monomer having a long-chain alkyl group.

28 Claims, 6 Drawing Sheets

(56) References Cited

U.S. PATENT DOCUMENTS

| | | | |
|---|---|---|---|
| 2007/0254976 A1* | 11/2007 | Hirata | C04B 24/2647 |
| | | | 522/107 |
| 2016/0380314 A1 | 12/2016 | Yang et al. | |
| 2018/0026270 A1 | 1/2018 | Bae et al. | |
| 2018/0294512 A1 | 10/2018 | Kim et al. | |
| 2019/0067699 A1* | 2/2019 | Bae | H01M 4/622 |
| 2019/0260029 A1* | 8/2019 | Suh | H01M 4/625 |

FOREIGN PATENT DOCUMENTS

| | | | |
|---|---|---|---|
| KR | 20170001069 A | 1/2017 | |
| KR | 20180007335 A | 1/2018 | |
| KR | 20180010789 A | 1/2018 | |
| WO | WO-2015133440 A1 * | 9/2015 | B01J 20/261 |

\* cited by examiner

BINDER, METHOD OF PREPARING THE SAME, ELECTRODE FOR SECONDARY BATTERY INCLUDING THE BINDER, AND SECONDARY BATTERY INCLUDING THE ELECTRODE

CROSS-REFERENCE TO RELATED APPLICATION

This application claims priority to Korean Patent Application No. 10-2018-0122036, filed on Oct. 12, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a binder, a method of preparing the binder, an electrode for a secondary battery, the electrode including the binder, and a secondary battery including the electrode.

2. Description of the Related Art

A silicon-based anode active material may undergo a large volume change during charging and discharging of a lithium battery. Accordingly, the lithium battery may not be provided with an anode having good mechanical properties and adhesive strength of the electrode, when a non-water-soluble binder such as polyvinylidene fluoride is used.

When polyvinyl alcohol is used as a binder, a lithium battery may have excellent initial efficiency and lifetime characteristics. However, stability of an anode slurry and workability such as electrode plate uniformity may be poor, and an anode active material layer is prone to cracking and separation from a current collector during charging and discharging. Accordingly, improvements are desired in this respect.

SUMMARY

Provided is a binder which suppresses bubble generation.
Provided is a method of preparing the binder.
Provided is an electrode for a secondary battery, the electrode including the binder.
Provided is a secondary battery having improved cell performance by use of the electrode.

Additional aspects will be set forth in part in the description which follows and, in part, will be apparent from the description, or may be learned by practice of the presented embodiments.

According to an aspect of an embodiment, a binder includes a metal salt of a graft copolymer, which is a polymerization product of polyvinyl alcohol, an ethylenically unsaturated carboxylic acid, and a polymerizable monomer having a long-chain alkyl group.

In one or more embodiments, the binder may further include another graft copolymer of the polyvinyl alcohol, the ethylenically unsaturated carboxylic acid, and the polymerizable monomer having a long-chain alkyl group.

According to an aspect of another embodiment, a method of preparing any of the above-described binders includes:
performing a polymerization reaction of the polyvinyl alcohol, the ethylenically unsaturated carboxylic acid, and the polymerizable monomer having a long-chain alkyl group to obtain a graft polymerization reaction product; and
reacting the graft polymerization reaction product with a monovalent metal compound to prepare a monovalent metal salt of a graft copolymer.

According to an aspect of another embodiment, an electrode for a secondary battery includes one of the above-described binders and an electrode active material.

According to an aspect of another embodiment, a secondary battery includes a first electrode, a second electrode, and an electrolyte disposed between the first electrode and the second electrode, wherein the first electrode is the above-described electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
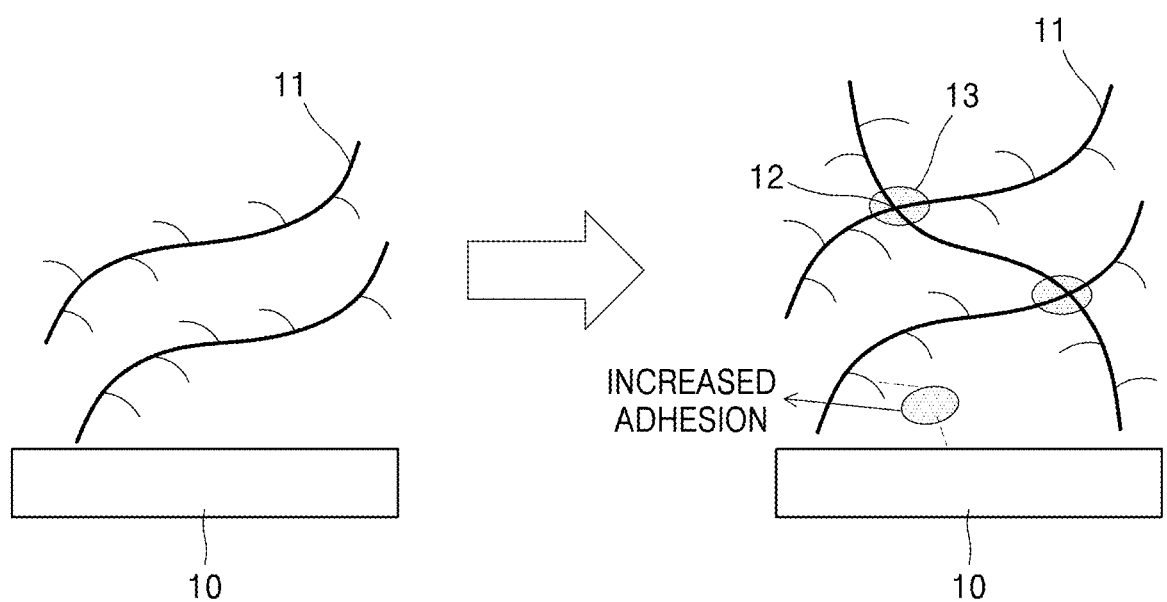
FIG. 1 is a view of an electrode including a binder according to an embodiment, for explaining an interaction between the binder and a current collector in the electrode.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, embodiments of a binder, a method of preparing the binder, an electrode for a secondary battery including the binder, and a secondary battery including the electrode will be described in greater detail.

According to an aspect of the inventive concept, a binder includes a metal salt of a graft copolymer, which is a polymerization product of polyvinyl alcohol, an ethylenically unsaturated carboxylic acid, and a polymerizable monomer having a long-chain alkyl group.

The graft copolymer may refer to a graft polymerization reaction product obtained through graft polymerization of polyvinyl alcohol, an ethylenically unsaturated carboxylic acid, and a polymerizable monomer having a long-chain alkyl group. The metal salt of a graft copolymer may be a product obtained by adding a metal-containing compound to the graft copolymer. The metal-containing compound may be, for example, a compound including a monovalent metal, a divalent metal, a trivalent metal, or a combination thereof.

The ethylenically unsaturated carboxylic acid and the polymerizable monomer having a long-chain alkyl group may have a functional group which is graft-polymerizable with a hydroxyl group of the polyvinyl alcohol. The functional group may be, for example, a group having an unsaturated bond.

The binder may further include a graft copolymer of the polyvinyl alcohol, the ethylenically unsaturated carboxylic acid, and the polymerizable monomer having a long-chain alkyl group.

The ethylenically unsaturated carboxylic acid may be a compound represented by Formula 1a or a combination of a compound represented by Formula 1a and alkylene oxide.

$$CHR_1=C(R_2)(R_3COOH) \qquad \text{Formula 1a}$$

In Formula 1a, $R_1$ may be hydrogen, a substituted or unsubstituted C1-C30 alkyl group, a substituted or unsubstituted C6-C30 aryl group, or —COOH; $R_2$ may be hydrogen, a substituted or unsubstituted C1-C30 alkyl group, a substituted or unsubstituted C6-C30 aryl group, or —(CH$_2$)$_a$COOH (wherein a is a number from 1 to 10), and $R_3$ may be a single chemical bond, a C1-C30 alkylene group, or a C6-C30 arylene group.

The ethylenically unsaturated carboxylic acid may be, for example, at least one of methacrylic acid, acrylic acid, itaconic acid, fumaric acid, crotonic acid, 2-ethyl acrylic acid, 2-pentenoic acid, trans-2-methyl-2-butenoic acid, and trans-2,3-dimethylacrylic acid.

In the polymerizable monomer having a long-chain alkyl group, the long-chain alkyl group may refer to, for example, a C4-C20 alkyl group. The polymerizable monomer having a long-chain alkyl group may be, for example, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, neodecanoic acid, 2,2-dimethyloctanoic acid, or a mixture thereof.

In one or more embodiments, the binder may include at least one additional monomer selected from a polymerizable monomer having a thiol group, a polymerizable monomer having a silane group, and a polymerizable monomer having an alkylene oxide group. When these polymerizable monomers are further included, the binder may be a metal salt of a graft copolymer obtained by a graft polymerization reaction of polyvinyl alcohol, the ethylenically unsaturated carboxylic acid, the polymerizable monomer having a long-chain alkyl group, and at least one selected from the polymerizable monomer having a thiol group, the polymerizable monomer having a silane group, and the polymerizable monomer having an alkylene oxide group.

For example, the polymerizable monomer having a thiol group may be HS—(CH$_2$)$_n$—COOH (wherein n is a number from 1 to 20). The polymerizable monomer having a silane group may be, for example, (R$_1$)(R$_2$)(R$_3$)Si—(CH$_2$)$_n$—COOH, wherein n may be a number from 1 to 20, and R$_1$ to R$_3$ may each independently be hydrogen, a C1-C30 alkyl group, or a C6-C30 aryl group.

The polymerizable monomer having an alkylene oxide group may be, for example, glycidyl methacrylate, glycidyl acrylate, allyl glycidyl ether, or a combination thereof.

A metal of the metal salt may be a monovalent metal, a divalent metal, a trivalent metal, or a combination thereof, for example, lithium (Li), magnesium (Mg), calcium (Ca), sodium (Na), potassium (K), aluminum (Al), cobalt (Co), or a combination thereof.

An anode including a silicon-based active material is known to use, as a binder, a polymer using polyvinyl alcohol and a cross-linking agent such as polyimide, due to its large volume expansion and contraction during charging and discharging. However, when such a polymer is used, bubbling and phase separation may occur, and stability of an anode active material composition and uniformity of the anode may be reduced. Accordingly, improvements are desired in this aspect.

To address these problems, the present disclosure provides a binder which may exhibit improved initial efficiency, lifetime characteristics, and electrode stability to a lithium battery including a silicon-based active material and may suppress volume change of an electrode.

In one or more embodiments, the binder may include a metal salt of a graft copolymer including polyvinyl alcohol as a main chain. The graft copolymer may have a first side chain derived from graft polymerization of the polyvinyl alcohol and the ethylenically unsaturated carboxylic acid, and a second side chain derived from graft polymerization reaction of the polyvinyl alcohol and the polymerizable monomer having a long-chain alkyl group.

In one or more embodiments, the binder may have the first side chain to block aggregation of the polyvinyl alcohol itself and have excellent adhesive characteristics due to having the first side chain, and may prevent bubble formation and have a stress relaxation effect due to having the second side chain.

In one or more embodiments, the metal salt of the graft copolymer may further have an additional third side chain derived from at least one polymerizable monomer selected from the polymerizable monomer having a thiol group, the polymerizable monomer having a silane group, and the polymerizable monomer having an alkylene oxide group. When the third side chain is derived from the polymerizable monomer having an alkylene oxide group, an electrode active material composition containing the binder may have a further improved anti-bubbling effect. In one or more embodiments, the binder may further include such a third side chain, in addition to the first side chain and the second side chain, and thus, may improve adhesive strength of the anode active material to an electrode current collector and a cohesive strength of an anode active material layer.

When the binder according to one or more embodiments is used, in preparation of an electrode slurry, formation of bubbles may be suppressed and formation of strong inter-chain hydrogen bonds in the polyvinyl alcohol may be hindered, thus preventing phase separation from water.

FIG. 1 is a diagram for explaining interaction between a binder according to an embodiment and a current collector in an electrode including the binder.

Referring to FIG. 1, a binder 11 according to an embodiment may have a network structure and thus increase cohesion of an electrode active material layer. A metal salt of a graft polymer of polyvinyl alcohol, an ethylenically unsaturated carboxylic acid, and a polymerizable monomer having a long-chain alkyl group as described above may include a metal 12 such as a divalent or trivalent metal. Due to interaction of the metal 12 such as a divalent or trivalent metal with the current collector 10 such as a copper thin film, the strength of binding between the binder 11 and the current collector 10 may be increased, and adhesion between an electrode active material layer and the current collector 10 may be increased. In FIG. 1, for the sake of convenience, when the metal of the binder is calcium (Ca), reference numeral 13 denotes a unit of —C(=O)—O—Ca—O—C(=O)— as a cross-linking point at which two —C(=O)—O— are bound to each other around Ca$^{2+}$. An electrode including the binder 11 may have increased intensity, and a secondary battery including the electrode may have improved lifetime.

The binder may be a copolymer including a first repeating unit represented by Formula 1, a second repeating unit represented by Formula 2 or 2a, and a third repeating unit represented by Formula 3. The copolymer may be a block copolymer, a random copolymer, or an alternating copolymer.

Formula 1

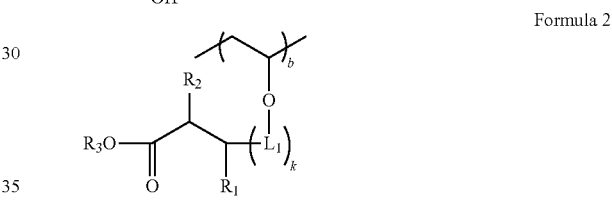

Formula 2

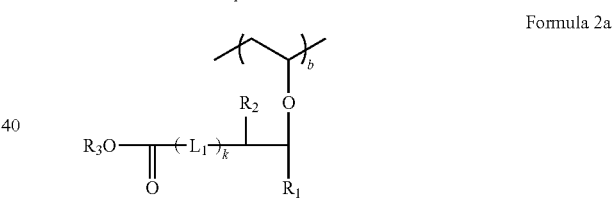

Formula 2a

In Formula 2 or 2a, R$_1$ and R$_2$ may each independently be hydrogen or a substituted or unsubstituted C1-C30 alkyl group, R$_3$ may be hydrogen, a monovalent metal, a divalent metal, a trivalent metal, or a combination thereof, L$_1$ as a linker may be a simple chemical bond, a C1-C30 alkylene group, or a C6-C30 arylene group, and k may be 0 or a number from 1 to 10. In Formula 2 or 2a, k is for example, 1.

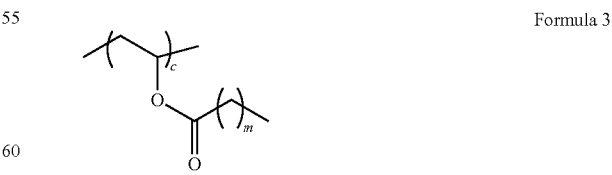

Formula 3

In Formula 3, m may be a number from 3 to 20, for example a number from 3 to 19.

In Formulae 1 to 3, a, b, and c may be mole fractions of the first, second, and third repeating units, respectively, and may each independently be a number from 0.01 to 0.99, and a sum of a, b and c may be 1.

The binder may further include at least one selected from a fourth repeating unit represented by Formula 4 and a fifth repeating unit represented by Formula 5.

Formula 4

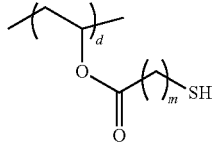

In Formula 4, m may be a number from 1 to 20, and d may be a number from 0.01 to 0.99, Formula 5

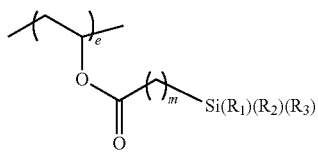

In Formula 5, m may be a number from 1 to 20, $R_1$ to $R_3$ may each independently be hydrogen, a $C_1$-$C_{30}$ alkyl group, or a C6-C30 aryl group, and may be a number from 0.01 to 0.99.

When the binder further includes the fourth repeating unit represented by Formula 4, a sum of a, b, c, and d may be 1. When the binder further includes the fifth repeating unit represented by Formula 5, a sum of a, b, c, and may be 1.

The binder may be a copolymer including a repeating unit represented by Formula 1, a repeating unit represented by Formula 2-1, and a repeating unit represented by Formula 3; or a copolymer including a repeating unit represented by Formula 1, a repeating unit represented by Formula 2-1, a repeating unit represented by Formula 2-2, and a repeating unit represented by Formula 3.

Formula 1

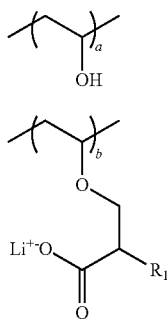

Formula 2-1

In Formula 2-1, $R_1$ may be hydrogen or a substituted or unsubstituted C1-C30 alkyl group, Formula 2-2

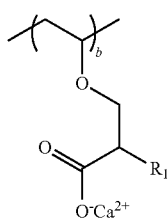

In Formula 2-2, $R_1$ may be hydrogen or a substituted or unsubstituted C1-C30 alkyl group.

Formula 3

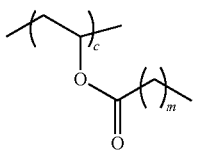

In Formula 3, m may be a number from 3 to 20, for example a number from 3 to 19.

In Formulae 1, 2-1, 2-2, and 3, a, b, and c may be mole fractions of the corresponding repeating units, respectively, and may each independently be a number from 0.01 to 0.99, and a sum of a, b, and c may be 1.

$Ca^{2+}$ of the repeating unit represented by Formula 2-2 may substantially be present in a state as represented by Formula 2-3 to control a charge balance of the binder to zero. For example, the repeating unit represented by Formula 2-2 may be a repeating unit represented by Formula 2-3.

Formula 2-3

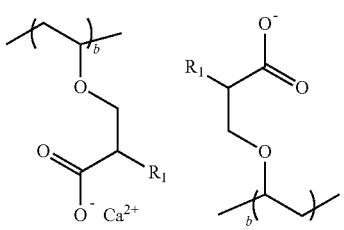

The repeating unit represented by Formula 2-2 may be a repeating unit represented by Formula 2-3.

In Formula 2-3, $R_1$, and b may be the same as defined in Formula 2-2.

The binder may be a polymer represented by Formula 6 or a polymer represented by Formula 7.

Formula 6

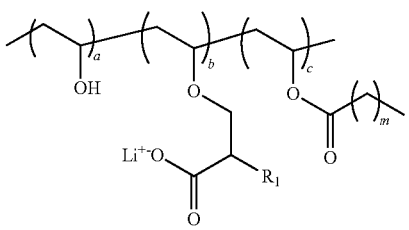

In Formula 6, a, b, and c may each independently be a number from 0.01 to 0.99, a sum of a, b, and c may be 1, m may be a number from 3 to 20, for example, a number from 3 to 19, and $R_1$ may be hydrogen or a substituted or unsubstituted C1-C30 alkyl group.

Formula 7

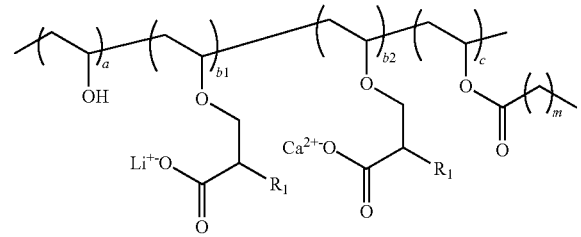

In Formula 7, a, b1, b2, and c may each independently be a number from 0.01 to 0.99, a sum of a, b, and c may be 1, m may be a number from 3 to 20, for example, a number from 3 to 19, $R_1$ may be hydrogen or a substituted or unsubstituted C1-C30 alkyl group. The polymer of Formula 7 may be controlled to have a charge balance.

In Formula 6, a may be, for example, a number from 0.095 to 0.86, b may be a number from 0.095 to 0.86, and c may be a number from 0.01 to 0.048. In Formula 7, a may be a number from 0.05 to 0.86, b1 may be a number from 0.095 to 0.8, b2 may be a number from 0.05 to 0.43, and c may be a number from 0.01 to 0.048.

In the binder according to one or more embodiments, a mixed weight ratio of the polyvinyl alcohol to the ethylenically unsaturated carboxylic acid may be about 9:1 to about 1:9, for example, about 9:1 to about 5:5.

In the binder according to one or more embodiments, the metal salt may include a lithium (Li) salt and a calcium (Ca) salt, and a mixed molar ratio of repeating units including the lithium salt to repeating units including the calcium salt may be about 1:1 to about 5:1.

An amount of the polymerizable monomer having a long-chain alkyl group may be about 0.1 part to about 10 parts by weight, for example, about 0.1 part to about 6 parts by weight, each based on 100 parts by weight of a total weight of the polyvinyl alcohol and the ethylenically unsaturated carboxylic acid.

In one or more embodiments, the binder may have a weight average molecular weight of about 10,000 Daltons to about 1,500,000 Daltons, for example, about 10,000 Daltons to about 1,200,000 Daltons, for example, about 10,000 Daltons to about 1,100,000 Daltons, for example, about 100,000 Daltons to about 500,000 Daltons, for example, about 100,000 Daltons to about 300,000 Daltons. While not wishing to be bound by theory, it is understood that when the binder has a weight average molecular weight within these ranges, the binder may have further improved physical properties.

The copolymers represented by the formulae above may each have a weight average molecular weight within these ranges of weight average molecular weights of the binder. In one or more embodiments, the binder may have a degree of polymerization of about 100 to about 20,000.

According to another aspect of the inventive concept, there is provided a method of preparing a binder according to any of the above-described embodiments. Embodiments of the method will now be described.

First, a graft copolymer may be obtained by performing polymerization reaction of polyvinyl alcohol, an ethylenically unsaturated carboxylic acid, and a polymerizable monomer having a long-chain alkyl group.

An amount of the ethylenically unsaturated carboxylic acid may be about 0.11 moles to about 9 moles with respect to 1 mole of the polyvinyl alcohol. An amount of the polymerizable monomer having a long-chain alkyl group may be about 0.01 moles to about 0.6 moles, for example, about 0.05 moles to about 0.5 moles, each with respect to 1 mole of the polyvinyl alcohol.

The polyvinyl alcohol may have a degree of polymerization of about 500 to about 10,000, for example, about 1,000 to about 3,000, and a degree of saponification (DS) of about 85 mole % or greater, for example, about 85 mole % to about 99.9 mole %, for example, about 88 mole % to about 99 mole %.

In the polymerization reaction, ammonium persulfate, potassium persulfate, hydrogen peroxide, azo-iso-butyronitrile, or a combination thereof may be used as a polymerization initiator. An amount of the polymerization initiator may be about 0.1 part to about 5 parts by weight, for example, about 0.5 part to about 1.5 parts by weight, with respect to 100 parts by weight of the polyvinyl alcohol and the polymerizable monomer.

Subsequently, the resulting polymerization product may be reacted with a monovalent metal compound to obtain a monovalent metal salt of the graft copolymer.

The monovalent metal salt of the graft copolymer may be reacted with a divalent metal compound, a trivalent metal compound, or a combination thereof to prepare a composite of the monovalent metal salt of the graft copolymer and a divalent metal salt, a composite of the monovalent metal salt of the graft copolymer or a trivalent metal salt, or a composite of the monovalent metal salt of the graft copolymer, a divalent metal salt, and a trivalent metal salt.

The monovalent metal compound may be lithium hydroxide, sodium hydroxide, potassium hydroxide, or a combination thereof. An amount of the monovalent metal compound may be about 0.5 moles to about 3.0 moles, for example, about 0.8 moles to about 2.5 moles, with respect to 1 mole of the ethylenically unsaturated carboxylic acid.

The divalent metal compound or trivalent metal compound may be calcium hydroxide, calcium acetate, magnesium acetate, cobalt nitrate hexahydrate, or aluminum acetylacetonate. An amount of the divalent metal compound or trivalent metal compound may be about 0.5 moles or less, for example, about 0.05 moles to about 0.5 moles, for example, about 0.05 moles to about 0.2 moles, each with respect to 1 mole of the ethylenically unsaturated carboxylic acid.

A total amount of the monovalent metal compound and one of the divalent metal compound and the trivalent metal compound may be about 1 mole to about 3 moles with respect to 1 mole of the ethylenically unsaturated carboxylic acid.

According to another aspect of the inventive concept, an electrode for a secondary battery includes a binder according to any of the above-described embodiments, and an electrode active material.

In one or more embodiments, the electrode may include a binder according to any of the above-described embodiment; and a cathode active material or an anode active material. For example, the electrode may be a cathode including a binder according to any of the embodiments and a cathode active material. For example, the electrode may be an anode including a binder according to any of the embodiments and an anode active material.

For example, the electrode may be an anode including a metal-based anode active material.

For example, the metal-based anode active material may be at least one selected from lithium metal, a metal alloyable with lithium, a composite of a metal alloyable with lithium and carbon, a composite of a metal alloyable with lithium and nitrogen, a composite of a metal alloyable with lithium, nitrogen and carbon, a composite of a metal alloyable with lithium and a metal inert to lithium, a composite of a metal alloyable with lithium and a metal oxide inert to lithium, a semimetal alloyable with lithium, and a composite of a metal alloyable with lithium and a metal nitride inert to lithium. For example, the metal alloyable with lithium may be, for example, tin (Sn), aluminum (Al), germanium (Ge), lead (Pb), bismuth (Bi), antimony (Sb), a Si—X alloy (wherein X may be an alkali metal, an alkaline earth metal, a Group 13 element, a Group 14 element, a Group 15 element, a Group 16 element, a transition metal, a rare earth element, or a combination thereof, and X is not Si), or a Sn—X alloy (wherein X may be an alkali metal, an alkaline earth metal, a Group 13 element, a Group 14 element, a Group 15 element, a Group 16 element, a transition metal, a rare earth element, or a combination thereof, and X is not Sn). The semimetal alloyable with lithium may be, for example, Si. X may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

For example, the composite of a metal alloyable with lithium and carbon may be an alloy or composite represented by Formula of $Si_xSn_qM_yC_z$, wherein q, x, y, and z represent atomic percent values, (a) $(q+x)>2y+z$; (b) $x>0$; (c) q and z are each independently 0 or greater; and (d) M may be at least one metal selected from manganese, molybdenum, niobium, tungsten, tantalum, iron, copper, titanium, vanadium, chromium, nickel, cobalt, zirconium, yttrium, and a combination thereof.

In Formula of $Si_xSn_qM_yC_z$, x, q, y, and z are defined so that the following condition are satisfied.

$x>0$; $q>0$, $y>0$, $z>0$, $(q+x)>2y+z$.

For example, the composite of a metal alloyable with lithium and a metal insert to lithium may be an alloy or composite represented by Formula of $Si_xM_yAl_z$, wherein x, y, and z represent atomic percent values, (a) $x+y+z=100$, (b) $x\geq55$, (c) $y<22$, (d) $z>0$, and (e) M may be at least one metal selected from manganese, molybdenum, niobium, tungsten, tantalum, iron, copper, titanium, vanadium, chromium, nickel, cobalt, zirconium, yttrium, and a combination thereof.

The anode may further include an additional anode active material, which may be at least one of a transition metal oxide, a non-transition metal oxide, and a carbonaceous material.

For example, the transition metal oxide may be a lithium titanium oxide, a vanadium oxide, or a lithium vanadium oxide. For example, the non-transition metal oxide may be $SnO_2$ or $SiO_x$ (wherein $0<x<2$). For example, the carbonaceous material may be crystalline carbon, amorphous carbon, or a mixture thereof. Examples of the crystalline carbon may include graphite, such as natural graphite or artificial graphite that are in nonshaped, irregular, plate, flake, spherical, or fibrous form. Examples of the amorphous carbon may include soft carbon (carbon sintered at low temperatures), hard carbon, meso-phase pitch carbonization products, and sintered cokes.

For example, the electrode active material of the electrode may be an anode active material selected from a silicon-based active material, a tin-based active material, a silicon-tin alloy-based active material, and a silicon-carbonaceous active material. However, embodiments are not limited thereto. For example, the silicon-based active material may increase interaction between the silicon-based active material and the binder due to a hydroxyl group present on a surface thereof, and thus provide improved binding strength between the anode active material and the binder. The binder may further include an aqueous silicon-based anode active material binder or an aqueous silicon/carbon-based anode active material binder.

The electrode may be obtained by coating and drying an electrode active material composition including a binder according to any of the embodiment, an electrode active material, and a solvent. An amount of the binder in the electrode active material composition may be 1 part to about 15 parts by weight, for example, about 3 parts to about 10 parts by weight with respect to 100 parts by weight of the electrode active composition.

The electrode active material composition may further include an anti-foaming agent. The anti-foaming agent may be, for example, at least one selected from ethanol, propanol, butanol, pentanol, hexanol, heptanol, octanol, nonanol, and decanol. An amount of the anti-foaming agent may be of a level commonly used in the art.

For example, the electrode active material composition may have a viscosity of about 200 centipoise (cps) to about 20,000 cps, and in some embodiments, about 2,000 cps to about 10,000 cps, and in some other embodiments, about 2,500 cps to about 5,000 cps.

When the amount of the binder is about 1 part to 10 parts by weight with respect to 100 parts by weight of the electrode active material composition, the electrode active material composition may have a viscosity of less than 5,000 cps, for example, about 2,000 cps to about 3,000 cps. While not wishing to be bound by theory, it is understood that when the electrode active material composition has a viscosity within these ranges, an electrode having a smooth surface in a satisfactory non-bumpy condition may be easily manufactured.

In one or more embodiments, the electrode may have a cohesive strength of about 7 gram force per millimeter (gf/mm) or greater, about 7 gf/mm to about 157 gf/mm, and an adhesive strength of about 1 gf/mm or greater, for example, about 1 gf/mm to about 2 gf/mm.

The binder may further include a water-soluble polymer selected from cellulose hydroxyethyl ether, dextran, carboxymethylcellulose (CMC), alginate, cellulose nanofiber, xanthan gum, and guar gum. Physical properties of the binder may be variously controlled by addition of these water-soluble polymers to the binder.

Use of the binder is not specifically limited. For example, the binder may be used in an electrochemical battery. Types of electrochemical batteries are not specifically limited, as long as capable of storing energy through electrochemical reaction, and may include primary batteries and secondary batteries. For example, the electrochemical battery may be a lithium battery, an alkali metal battery such as a sodium battery, an alkali earth metal battery such as a magnesium battery, a metal-air battery, a super capacitor, a fuel cell, and the like.

For example, an anode may be manufactured by mixing an anode active material, a conducting agent, a binder according to any of the above-described embodiments, and a solvent to prepare an anode active material composition and directly coating the anode active material composition on a current collector, for example, a copper foil. In some other embodiments, the anode active material composition may be cast on a separate support to form an anode active material film. This anode active material film may then be separated from the support and laminated on a copper current collector, thereby manufacturing an anode.

The conducting agent may be acetylene black, Ketjen black, natural graphite, artificial graphite, carbon black, carbon fiber, and metal powder and metal fiber of, for example, copper, nickel, aluminum, or silver. In some embodiments, the conducting agent may include at least one conductive material such as a polyphenylene derivative, which may be used alone or in a combination. However, embodiments are not limited thereto. Any suitable conducting agent available in the art may be used. Any of the above-described carbonaceous materials may be added as the conducting agent.

In addition to a binder according to any of the above-described embodiments, a water-soluble polymer selected from cellulose hydroxyethyl ether, dextran, carboxymethylcellulose (CMC), alginate, cellulose nanofiber, xanthan gum and guar gum; a vinylidene fluoride/hexafluoropropylene copolymer, polyvinylidene fluoride (PVDF), polyacrylonitrile, polymethylmethacrylate, polytetrafluoroethylene, or a mixture thereof; or a styrene-butadiene rubber-based polymer may be additionally used. However, embodiments are not limited thereto. Any material available as a binder in the art may be additionally used.

The solvent may be, for example, N-methyl-pyrrolidone, acetone, or water. However, embodiments are not limited thereto. Any suitable material available as a solvent in the art may be used.

The amounts of the anode active material, the conducting agent, and the solvent may be substantially the same as those generally used in lithium batteries. At least one of the conducting agent and the solvent may be omitted according to the use and the structure of a lithium battery.

A cathode may be manufactured in the same manner as the above-described anode, except that a cathode active material is used instead of the anode active material. The same conducting agent, binder, and solvent as those used in the anode may be used in a cathode active material composition.

For example, the cathode may be manufactured by mixing a cathode active material, a conducting agent, a binder, and a solvent to prepare the cathode active material composition and directly coating the cathode active material composition on an aluminum current collector. In some other embodiments, the cathode active material composition may be cast on a separate support to form a cathode active material film. This cathode active material film may then be separated from the support and laminated on an aluminum current collector to thereby manufacture a cathode.

The cathode active material may include at least one selected from the group consisting of lithium cobalt oxide, lithium nickel cobalt manganese oxide, lithium nickel cobalt aluminum oxide, lithium iron phosphorous oxide, and lithium manganese oxide. However, embodiments are not limited thereto. Any suitable cathode active material available in the art may be used.

For example, the cathode active material may be a compound represented by one of the following formulae: $Li_aA_{1-b}B'_bD'_2$ (wherein $0.90 \leq a \leq 1.8$, and $0 \leq b \leq 0.5$); $Li_aE_{1-b}B'_bO_{2-c}D'_c$ (wherein $0.90 \leq a \leq 1.8$, $0 \leq b \leq 0.5$, $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'\alpha$ (wherein $0.90 \leq a \leq 1.8$, $0 \leq b \leq 0.5$, c 0.05, and $0 < \alpha \leq 2$); $Li_aNi_{1-b-c}Mn_bB'_cO_{2-\alpha}F'\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001$ d $0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the foregoing formulae, A may be nickel (Ni), cobalt (Co), manganese (Mn), or a combination thereof; B' may be aluminum (Al), Ni, Co, Mn, chromium (Cr), iron (Fe), magnesium (Mg), strontium (Sr), vanadium (V), a rare earth element, or a combination thereof; D' may be oxygen (O), fluorine (F), sulfur (S), phosphorus (P), or a combination thereof; E may be Co, Mn, or a combination thereof; F' may be F, S, P, or a combination thereof; G may be Al, Cr, Mn, Fe, Mg, lanthanum (La), cerium (Ce), Sr, V, or a combination thereof; Q may be titanium (Ti), molybdenum (Mo), Mn, or a combination thereof; I' may be Cr, V, Fe, scandium (Sc), yttrium (Y), or a combination thereof; and J may be selected from V, Cr, Mn, Co, Ni, copper (Cu), or a combination thereof.

The compounds listed above as cathode active materials may have a surface coating layer (hereinafter, also referred to as "coating layer"). Alternatively, a mixture of a compound without a coating layer and a compound having a coating layer, the compounds being selected from the above-listed compounds, may be used. In one or more embodiments, the coating layer may include at least one compound of a coating element selected from oxide, hydroxide, oxyhydroxide, oxycarbonate, or hydroxycarbonate of the coating element. In one or more embodiments, the compounds for the coating layer may be amorphous or crystalline. In one or more embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In one or more embodiments, the coating layer may be formed using any of the above-listed compounds and the coating elements for the coating layer by using any suitable method that does not adversely affect the physical properties of the cathode active material. For example, the coating layer may be formed using a spray coating method or a dipping method. The coating method may be easily understood by those of ordinary skill in the art, and thus a detailed description thereof is omitted herein.

Examples of the cathode active material may include $LiNiO_2$, $LiCoO_2$, $LiMn_xO_{2x}$ (wherein x=1 or 2), $LiNi_{1-x}Mn_xO_2$ (wherein $0<x<1$), $LiNi_{1-x-y}Co_xMn_yO_2$ (wherein $0 \leq x \leq 0.5$ and $0 \leq y \leq 0.5$), and $LiFePO_4$.

According to another aspect of the inventive concept, a lithium battery includes a first electrode, a second electrode, and an electrolyte between the first electrode and the second electrode. For example, the first electrode may be a cathode, and the second electrode may be an anode. In some embodiments, the first electrode may be an anode, and the second electrode may be a cathode.

The lithium battery may be manufactured in the following manner.

First, the anode and the cathode may be manufactured according to the above-described anode or cathode manufacturing method.

Next, a separator to be disposed between the cathode and the anode may be prepared. The separator for the lithium battery may be any separator commonly used in lithium batteries. In some embodiments, the separator may have low resistance to migration of ions in an electrolyte and have good electrolyte-retaining ability. Examples of the separator are glass fiber, polyester, Teflon, polyethylene, polypropylene, PTFE, and a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

In one or more embodiments, a polymer resin, a filler, and a solvent may be mixed together to prepare a separator composition. Then, the separator composition may be directly coated on an electrode, and then, dried to form the separator. In some embodiments, the separator composition may be cast on a support, and then, dried to form a separator film. This separator film may then be separated from the support and laminated on an electrode to form the separator.

The polymer resin used to manufacture the separator may be any material commonly used as a binder for electrode plates. Examples of the polymer resin are a vinylidene fluoride/hexafluoropropylene copolymer, PVDF, polyacrylonitrile, polymethylmethacrylate, and a mixture thereof.

Then, an electrolyte may be prepared.

In one or more embodiments, the electrolyte may be an organic electrolyte solution. In some embodiments, the electrolyte may be in a solid phase. Examples of the electrolyte are lithium oxide and lithium oxynitride. Any material available as a solid electrolyte in the art may be used. In some embodiments, the solid electrolyte may be formed on the anode by, for example, sputtering.

In one or more embodiments, the organic electrolyte solution may be prepared by dissolving a lithium salt in an organic solvent.

The organic solvent may be any solvent available as an organic solvent in the art. In some embodiments, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl-iso-propyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N, N-dimethyl formamide, dimethyl acetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

In one or more embodiments, the lithium salt may be any material available as a lithium salt in the art. In some embodiments, the lithium salt may be $LiPF_6$, $LiBF_4$, $LiSbFe$, $LiAsFe$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y may each independently be a natural number), LiCl, LiI, or a mixture thereof.

Figure 6:
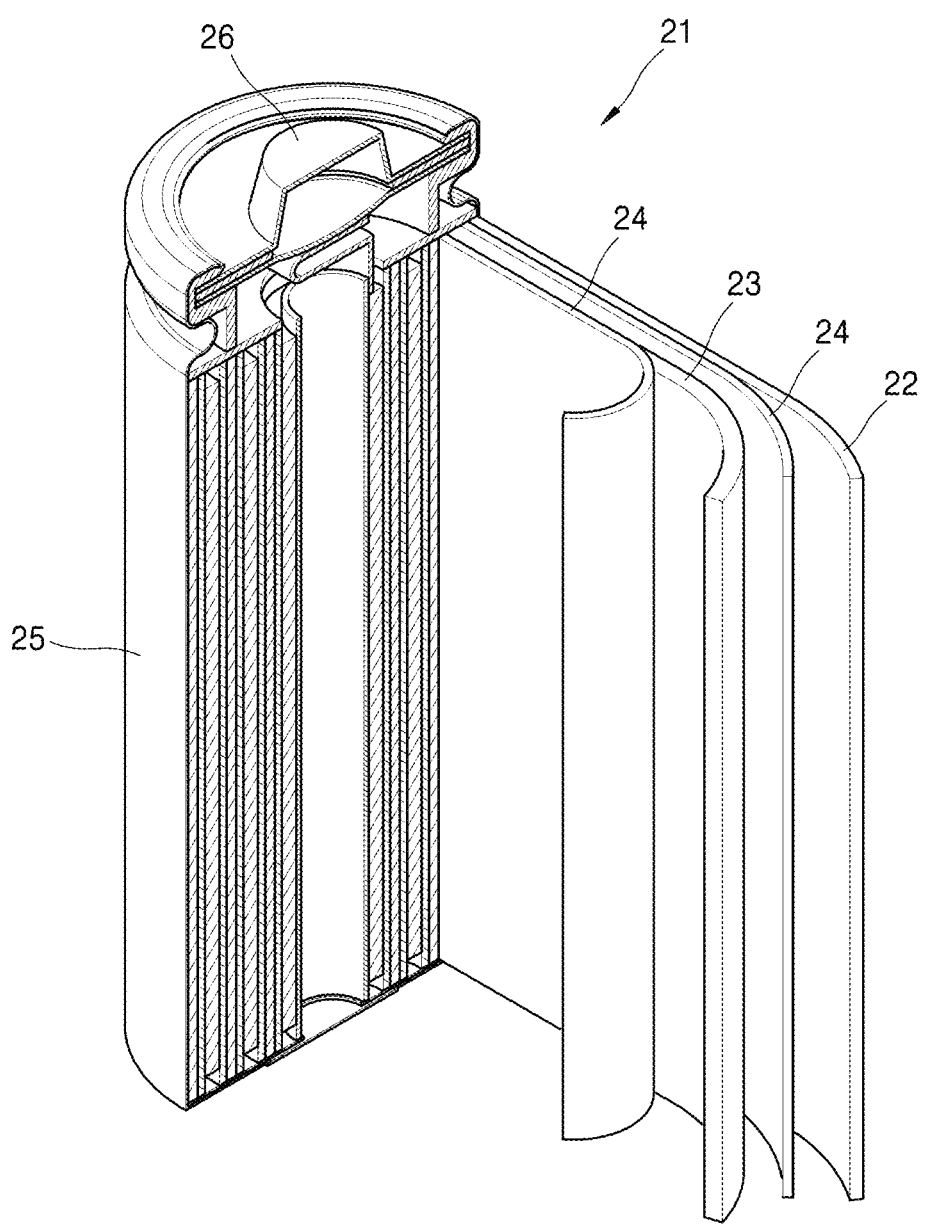
FIG. 6 is a schematic view of a lithium battery according to an embodiment.

Referring to FIG. 6, a lithium battery 21 according to an embodiment may include a cathode 23, an anode 22, and a separator 24. In some embodiments, the cathode 23, the anode 22, and the separator 24 may be wound or folded, and then, sealed in a battery case 25. In some embodiments, the battery case 25 may be filled with an organic electrolyte solution and sealed with a cap assembly 26, thereby completing the manufacture of the lithium battery 21. In some embodiments, the battery case 25 may have a cylindrical, rectangular, or thin-film shape. For example, the lithium battery 21 may be a thin-film-type battery. In some embodiments, the lithium battery 21 may be a lithium ion battery.

In one or more embodiments, the separator 24 may be disposed between the cathode 23 and the anode 22 to form a battery assembly. In some embodiments, the battery assembly may be stacked in a bi-cell structure and impregnated with an organic electrolyte solution. In some embodiments, the resultant assembly may be put into a pouch and hermetically sealed, thereby completing the manufacture of a lithium ion polymer battery.

In one or more embodiments, a plurality of battery assemblies may be stacked to form a battery pack, which may be used in any device that requires high capacity and high output, for example, in a laptop computer, a smartphone, or an electric vehicle. The lithium battery may have improved lifespan characteristics and high-rate characteristics, and thus may be suitable for use in an electric vehicle (EV), for example, in a hybrid vehicle such as a plug-in hybrid electric vehicle (PHEV).

Substituents in the formulae above may be defined as follows.

An alkyl group may refer to a completely saturated, branched or unbranched (or a straight or linear) hydrocarbon group. Non-limiting examples of the alkyl group may include a methyl group, an ethyl group, a n-propyl group, an iso-propyl group, a n-butyl group, an iso-butyl group, a sec-butyl group, a t-butyl group, an iso-pentyl group, a neo-pentyl group, a n-hexyl group, a 3-methylhexyl group, a 2,2-dimethylpentyl group, a 2,3-dimethylpentyl group, and a n-heptyl group. At least one hydrogen atom of the alkyl group may be substituted with a halogen atom, a $C_1$-$C_{20}$ alkyl group substituted with a halogen atom (for example, $CF_3$, $CH_3CF_2$, $CH_2F$, $CCl_3$, and the like), a $C_2$-$C_{20}$ alkoxy group, a $C_2$-$C_{20}$ alkoxyalkyl group, a hydroxyl group, a nitro group, a cyano group, an amino group, an alkyl amino group, an amidino group, a hydrazine group, a hydrazone group, a carboxyl group or a salt thereof, a sulfonyl group, a sulfamoyl group, a sulfonic acid group or a salt thereof, a phosphoric acid group or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

An alkenyl group may refer to an aliphatic hydrocarbon group including one or more double bonds. An alkynyl group may refer to an aliphatic hydrocarbon including one or more triple bonds.

A cycloalkyl group may refer to an aliphatic hydrocarbon including at least one ring. The alkyl group in the cycloalkyl group may be the same as described above. A heterocycloalkyl group may refer to a cycloalkyl group including at least one heteroatom selected from selected from nitrogen (N), oxygen (O), phosphorous (P), and sulfur (S). The cycloalkyl group in the heterocycloalkyl group may be the same as described above.

A halogen atom may include fluorine, bromine, chlorine, iodine, or the like.

An alkoxy group indicates "alkyl-O—", wherein the alkyl group may be the same as described above. Non-limiting examples of the alkoxy group may include a methoxy group, an ethoxy group, a propoxy group, a 2-propoxygroup, a butoxy group, a t-butoxy group, a pentyloxy group, and a hexyloxy group. At least one hydrogen atom in the alkoxy group may be substituted with one of the substituents as described above in connection with the alkyl group.

A cycloalkyloxy group indicates "cycloalkyl-O—", wherein the cycloalkyl group may be the same as described above. A heterocycloalkyloxy group indicates "heterocycloalkyl-O—", wherein the heterocycloalkyl group may be the same as described above.

The term "aryl" group, which is used alone or in combination, refers to an aromatic hydrocarbon group containing at least one ring. The aryl group is construed as including a group having an aromatic ring fused to at least one cycloalkyl ring. Non-limiting examples of the aryl group may include a phenyl group, a naphthyl group, and a tetrahydronaphthyl group. At least one hydrogen atom in the aryl group may be substituted with one of the substituents as described above in connection with the alkyl group.

An arylalkyl group indicates "aryl-alkyl", wherein the alkyl group and the aryl group may be the same as described above.

An aryloxy group indicates "aryl-O—", wherein the aryl group may be the same as described above.

An arylthio group indicates "aryl-S—", wherein the aryl group may be the same as described above.

A heteroaryl group may refer to a monocyclic or bicyclic aromatic organic compound including at least one heteroatom selected from nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms.

Non-limiting examples of the monocyclic heteroaryl group may include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiaxolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isoxazol-3-yl group, an isoxazol-4-yl group, an isoxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a pyrazin-2-yl group, a pyrazin-4-yl group, a pyrazin-5-yl group, a pyrimidin-2-yl group, a pyrimidin-4-yl group, or a pyrimidin-5-yl group.

The heteroaryl group may also include a heteroaromatic ring fused to at least one of an aryl group, a cycloaliphatic group, or a heterocyclic group.

Non-limiting examples of the bicyclic heteroaryl group may include an indolyl group, an isoindolyl group, an indazolyl group, an indolizinyl group, a purinyl group, a quinolizinyl group, a quinolinyl group, and an isoquinolinyl group. At least one hydrogen atom of the heteroaryl group may be substituted with one of the substituents as described above in connection with the alkyl group.

A heteroaryl alkyl group indicates "heteroaryl-alkyl", wherein the aryl group is the same as described above. A heteroaryloxy group indicates "heteroaryl-O—", wherein the heteroaryl group may be the same as described above. A hetero arylthio group indicates "heteroaryl-S—", wherein the heteroaryl group is the same as described above.

The terms "alkylene", "arylene", "heteroarylene", "cycloalkylene", and "heterocycloalkylene" may refer to an alkyl, aryl, heteroaryl, cycloalkyl, and heterocycloalkyl group, respectively, of which one hydrogen atom is removed.

One or more embodiments of the present disclosure will now be described in detail with reference to the following examples. However, these examples are only for illustrative purposes and are not intended to limit the scope of the one or more embodiments of the present disclosure.

EXAMPLES

Examples 1 to 7 and Comparative Example 1: Evaluation According to Different Mixed Weight Ratios of Polyvinyl Alcohol (PVA) to Acrylic Acid (AA)

Binders were prepared with different mixed weight ratios of polyvinyl alcohol (PVA) to acrylic acid (AA), and used to form anodes. Physical properties (adhesive strength and cohesive strength) of each of the anodes including the binders were evaluated.

In Example 1, a lithium salt of a graft copolymer was prepared as follows.

16 g of polyvinyl alcohol (PVA) (Mw=89,000 Daltons, degree of saponification: 99 mole % or greater, available from Aldrich) was mixed with 175 g of water (solvent), and then, dissolved by heating at about 90° C. under nitrogen gas purge for about 3 hours. About 4 g of acrylic acid (AA) from which a polymerization inhibitor was removed was added to the solution and stirred at room temperature (25° C.) under nitrogen gas atmosphere for about 30 minutes to obtain a mixture. 0.4 g of $(NH_4)_2S_2O_8$ and 0.12 g of $NaHSO_3$ were previously dissolved in 5 g of water (solvent), and then, this mixture was slowly injected with a syringe into the solution over about 5 minutes. After a temperature of a reactor was increased to 55° C., the solution was reacted for about 30 minutes, followed by adding 0.1 g of octanoic acid to the solution. A resulting mixture was heated at about 55° C. for about 4 hours for graft polymerization reaction.

Subsequently, 10.9 g of a 10-wt % lithium hydroxide (LiOH) aqueous solution was added to a graft polymerization product obtained through the graft polymerization reaction to thereby obtain a solution of a lithium salt of the graft copolymer. 3.6 g of a 10-wt % (wt %=percent by weight) calcium acetate aqueous solution was added to the solution of the lithium salt of the graft copolymer, and then, reacted at room temperature (25° C.) for about 12 hours to obtain a composite of the lithium salt of the graft copolymer and a calcium salt.

Binders of Examples 2 to 7 and Comparative Example 1 were prepared in the same manner as in Example 1, except that the compositions of components were varied as shown in Table 1.

TABLE 1

| Example | Mixed weight ratio of PVA to AA | Amount of octanoic acid (parts by weight with respect to 100 parts by weight of a total weight of PVA and AA) | LiOH (with respect to 1 mole of AA) | Calcium salt (with respect to 1 mole of AA) |
|---|---|---|---|---|
| Example 1 | 8:2 | 0.5 | 1 mole | 0.2 mole |
| Example 2 | 7:3 | 0.5 | 1 mole | 0.2 mole |
| Example 3 | 6:4 | 0.5 | 1 mole | 0.2 mole |
| Example 4 | 5:5 | 0.5 | 1 mole | 0.2 mole |
| Example 5 | 4:6 | 0.5 | 1 mole | 0.2 mole |
| Example 6 | 3:7 | 0.5 | 1 mole | 0.2 mole |
| Example 7 | 2:8 | 0.5 | 1 mole | 0.2 mole |
| Comparative Example 1 | 10:0 | 0 | 0 mole | 0 mole |

Figure 7:
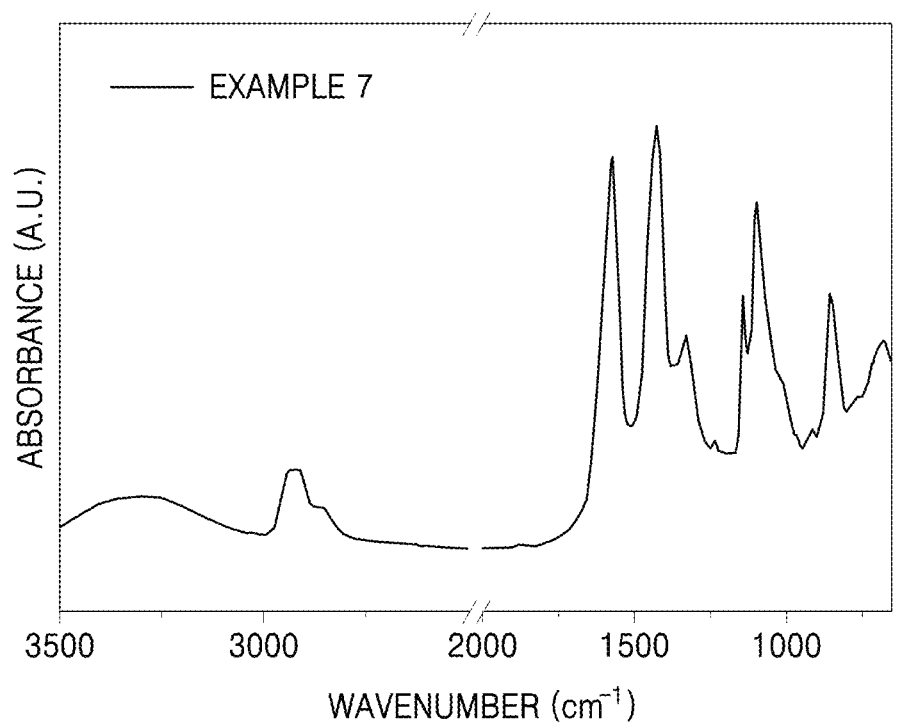
FIG. 7 is a plot of absorbance (arbitrary units, A.U.) versus wavenumber (reverse centimeters, $cm^{-1}$) exhibiting an infrared (IR) spectrum of a lithium salt of a graft copolymer obtained according to Example 7.

A structure of a lithium salt of a graft copolymer obtained according to Example 7 was identified by infrared (IR) spectroscopy. The result is shown in FIG. 7. Referring to FIG. 7, an —OH stretching band was observed at a wavenumber of about 3000 $cm^{-1}$ to 3600 $cm^{-1}$, a —CH$_2$ stretching band at a wavenumber of about 2850 cm$^{-1}$ to 3000 cm$^{-1}$, a C=O stretching band at a wavenumber of about 1580 cm$^{-1}$, and a —CH$_2$ deformation band at a wavenumber of about 1420 cm$^{-1}$. The graft copolymers prepared according to Examples 1 to 7 were random copolymers.

Evaluation Example 1: Cohesive Strength and Adhesive Strength of Electrode

Anodes using the binders of Examples 1-7 and Comparative Example 1 were manufactured in the following manner. Physical characteristics (cohesive strength and adhesive strength) of the anodes and charge-discharge characteristics of lithium batteries using the anodes were analyzed.

A Si—C composite (average particle diameter: 15 μm, Shin-Etsu Chemical Co.) as an anode active material, graphite powder (average particle diameter 3 μm, BTR), artificial graphite as a conducting agent, and one of the binders of Examples 1 to 7 and Comparative Example 1 were mixed in a weight ratio of about 15:70:10:5 to obtain a mixture, followed by adding water thereto and mixing the mixture in an agate mortar with a pestle to thereby obtain an anode active material slurry. The amount of the water was about 100 parts by weight with respect to 100 parts by weight of the mixture.

The anode active material slurry was coated on a copper foil having a thickness of about 10 μm, dried in a 80° C. oven for about 1 hour (first drying), and then, in a 130° C. vacuum oven for about 2 hours (second drying), and then, roll-pressed to thereby manufacture an anode having a mixture density of about 1.7 grams per cubic centimeter (g/cc) and a thickness of about 660 μm.

An adhesive strength and cohesive strength of each of the anodes were measured by a test in which a tape (18 mm×100 mm, 3M) was attached to an anode with an end portion of 10 millimeters (mm) was left unattached, and then, the end portion of the tape and the anode were pulled at the same time with a peel adhesion tester (KP-MIT-s) at a speed of about 399 millimeters per minute (mm/min) and a load of about 1.0 kilogram force (kgf).

The results of the evaluation of the adhesive strengths and cohesive strengths of the anodes using the binders of Examples 1 to 7 and Comparative Example 1 are shown in Table 2.

Evaluation Example 2: Charge-Discharge Characteristics of Coin Half Cell

A Si—C composite (average particle diameter 15 μm, Shin-Etsu Chemical Co.) as an anode active material, graphite powder (average particle diameter 3 μm, BTR New Energy Materials Inc.), artificial graphite as a conducting agent, and one of the binders of Examples 1 to 7 and Comparative Example 1 were mixed in a weight ratio of about 15:70:11:4 to obtain a mixture, followed by mixing the mixture with water in an agate mortar with a pestle to thereby obtain an anode active material slurry. The amount of the water was about 100 parts by weight with respect to 100 parts by weight of the mixture.

The anode active material slurry was coated on a copper foil having a thickness of about 10 μm, dried in a 80° C. oven for about 1 hour (first drying), and then, in a 180° C. vacuum oven for about 2 hours (second drying), and then, roll-pressed to thereby manufacture an anode having a mixture density of about 1.7 g/cc and a thickness of about 660 μm.

A coin half cell (CR-2032 type) was manufactured using each of the anodes, a Li metal as a counter electrode, a polypropylene separator (Cellgard 3510), and a liquid electrolyte in which 1.3 M LiPF$_6$ was dissolved in a mixed solvent of ethylene carbonate (EC), fluoroethyl carbonate (FEC), and diethyl carbonate (DEC) in a volume ratio of about 2:2:6.

Each of the lithium batteries (coin half cells) was charged at about 25° C. with a constant current of 0.1 C rate until a voltage of 0.01 volts (V) (with respect to Li) was reached, and then, with a constant voltage of 0.01 V until a current of 0.01 C was reached. Then, each fully charged lithium battery was rested for about 20 minutes and then discharged with a constant current of 0.1 C until a voltage of 1.5 V (with respect to Li) was reached (1st cycle).

Subsequently, each lithium battery was charged with a constant current of 0.2 C rate until a voltage of 0.01 V (with respect to Li) was reached, and then, with a constant voltage of 0.01 V until a current of 0.01 C was reached. Then, each fully charged lithium battery was rested for about 10 minutes, and then, discharged with a constant current of 0.2 C until a voltage of 1.5 V (with respect to Li) was reached ($2^{nd}$ cycle) ($1^{st}$-$2^{nd}$ cycles correspond to a formation cycle).

After the formation cycle, each coin half cell (lithium battery) was charged at about 25° C. with a constant current of 1.0 C rate until a voltage of 0.01 V (with respect to Li) was reached, and then, with a constant voltage of 0.01 V until a current of 0.01 C was reached. Then, each fully charged coin cell was rested for about 10 minutes, and then, repeatedly discharged with a constant current of 1.0 C until a voltage of 1.5 V (with respect to Li) ($3^{rd}$ cycle). The charge-discharge cycle was repeated 50 times (53 cycles).

An initial efficiency, discharge capacity, capacity retention of each battery were calculated using Equations 1 to 3, respectively.

Charge-discharge efficiency [%]=[Discharge capacity at each cycle/Charge capacity at each cycle]×100%    Equation 1

Initial efficiency [%]=[Discharge capacity at $1^{st}$ cycle/Charge capacity at $1^{st}$ cycle]×100%    Equation 2

Capacity retention (CRR) [%]=[Discharge capacity at $53^{rd}$ cycle/Discharge capacity at $3^{rd}$ cycle]×100%    Equation 3

The results of evaluation of charge-discharge characteristics of the coin half cells including the anodes manufactured using the binders of Examples 1-7 and Comparative Example 1 are shown in Table 2.

TABLE 2

| | Mixed weight ratio of PVA to AA | Physical properties of anode | | Charge-discharge characteristics of coin half cell | | |
|---|---|---|---|---|---|---|
| Example | | Adhesive strength (gf/mm) | Cohesive strength (gf/mm) | Initial efficiency (%) (0.1 C) | Discharge capacity (mAh/g) (0.1 C) | CRR (%) 1 C 50 Cyc |
| Example 1 | 8:2 | 1.4 | 14.6 | 89.5 | 512 | 92.7 |
| Example 2 | 7:3 | 1.0 | 11.3 | 89.6 | 466 | 93.9 |

TABLE 2-continued

| Example | Mixed weight ratio of PVA to AA | Physical properties of anode | | Charge-discharge characteristics of coin half cell | | |
|---|---|---|---|---|---|---|
| | | Adhesive strength (gf/mm) | Cohesive strength (gf/mm) | Initial efficiency (%) (0.1 C) | Discharge capacity (mAh/g) (0.1 C) | CRR (%) 1 C, 50 Cyc |
| Example 3 | 6:4 | 1.1 | 12.7 | 89.2 | 501 | 92.1 |
| Example 4 | 5:5 | 1.0 | 13.1 | 89.1 | 481 | 90.2 |
| Example 5 | 4:6 | — | 11.8 | 88.6 | 512 | 80.0 |
| Example 6 | 3:7 | — | — | 88.7 | 518 | 77.7 |
| Example 7 | 2:8 | — | — | 88.4 | 514 | 73.3 |
| Comparative Example 1 | 10:0 | 0.2 | 5.8 | 88.2 | 482 | 75.6 |

Referring to Table 2, the anodes and the coin half cells obtained by using the binders of Examples 1 to 4 were found to have improved cohesive strength and adhesive strength, as compared with the anode and the coin half cell of Comparative Example 1 using only PVA. From these results, it was found that phase separation and bubbling were inhibited in the anode active material compositions including PVA and AA in a weight ratio of about 8:2 to 5:5, and the anodes manufactured using the anode active material compositions had improved adhesive strength and cohesive strength, resulting in improved charge-discharge characteristics of the coin half cells.

Also, the coin half cells having anodes using the binders of Examples 6 to 7 were found to have improved initial efficiency, as compared with the anode and the coin half cell of Comparative Example 1 using only PVA. The coin half cell having anode using the binder of Example 6 was found to have improved charge-discharge characteristics, as compared with the anode and the coin half cell of Comparative Example 1 using only PVA.

[Examples 2, 8-10 and Comparative Example 2]: Evaluation with Different Amounts of Lithium Hydroxide Binders were prepared with different amounts of lithium hydroxide (LiOH). Viscosities of anode active material slurries including the binders, respectively, physical properties (adhesion and cohesive strengths) of the anodes, and charge-discharge characteristics of lithium batteries including the anodes, respectively, were evaluation.

The binders of Examples 8-10 and Comparative Example 2 were prepared in the same manner as in Example 2, except that the amount of lithium hydroxide was varied depending on the conditions as represented in Table 3. Anodes using the binders, respectively, and coin half cells were evaluated.

First, viscosities of the anode active material slurries using the binders of Examples 2, 8, and 9 were measured. The results are shown in FIG. 2.

As the amount of LiOH is increased, due to chain spreading from random coils to extended coils by doping, the slurry had an increased viscosity. When the amount of LiOH is 1.0 equivalent (equiv.) or greater, the slurry had an increased viscosity due to precipitation of lithium salt and additional ionic bonds in lithium salts.

Figure 2:
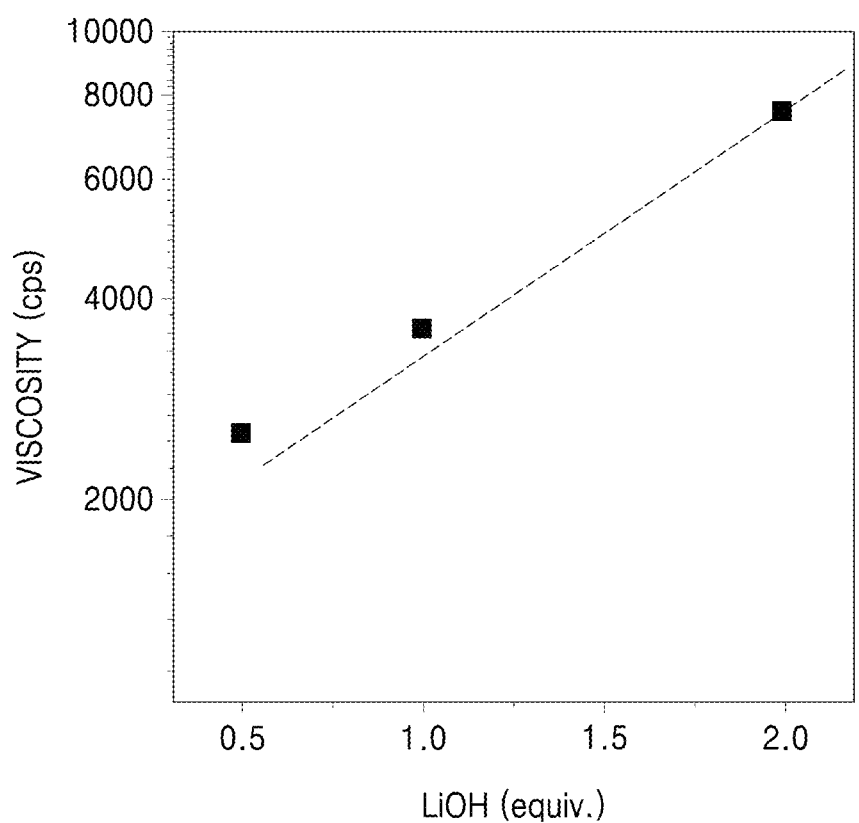
FIG. 2 is a graph of viscosity (centipoise, cps) versus LiOH equivalents (equiv.), illustrating the relationship of viscosity with respect to an amount of lithium hydroxide in anode slurries including the binders of Examples 1, 8, and 9, respectively.

Referring to FIG. 2, it was found that as the amount of lithium hydroxide is increased, the anode active material slurry had an increased viscosity. When the amount of lithium hydroxide was about 1.0 to about 2.0 equiv., the anode active material slurry had a viscosity of about 3000 cps to about 7000 cps, which was suitable for manufacturing an anode.

Physical properties of the anodes manufacturing using the binders of Examples 1, 8, and 9 and Comparative Example 2 were evaluated as described in Evaluation Example 1. Charge-discharge characteristics of the coin half cells including the anodes were evaluated according to Evaluation Example 2, and the evaluation results are shown in Table 3.

TABLE 3

| Example | Mixed weight ratio of PVA to AA | Amount of octanoic acid (parts by weight with respect to 100 parts by weight of a total weight of PVA and AA) | Amount of LiOH (with respect to 1 mole of AA) | Amount of calcium salt (with respect to 1 mole of AA) |
|---|---|---|---|---|
| Example 2 | 7:3 | 5 | 1 mole | 0.2 mole |
| Example 8 | 7:3 | 5 | 2 mole | 0.2 mole |
| Example 9 | 7:3 | 5 | 0.5 mole | 0.2 mole |
| Comparative Example 2 | 7:3 | 5 | 0 mole | 0 mole |

Figure 3:
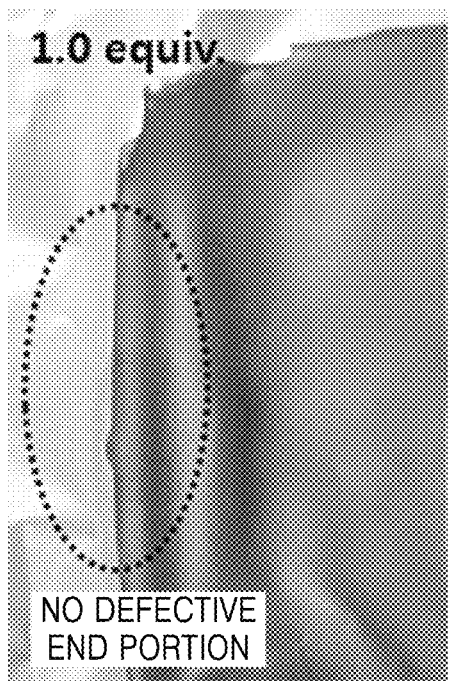
FIGS. 3 to 5 are images showing whether end portions of anodes manufactured using the binders of Examples 1 and 8 and Comparative Example 2, respectively, were defective or not.
Figure 4:
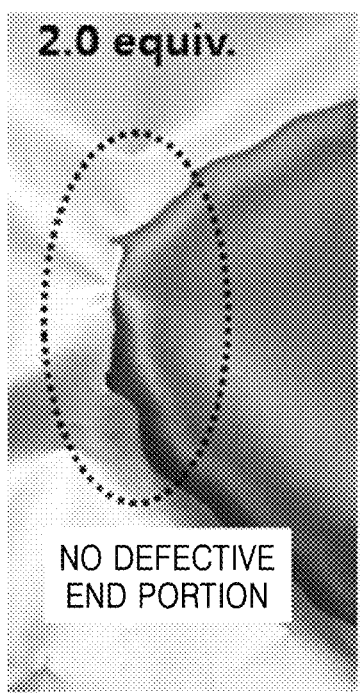
Figure 5:
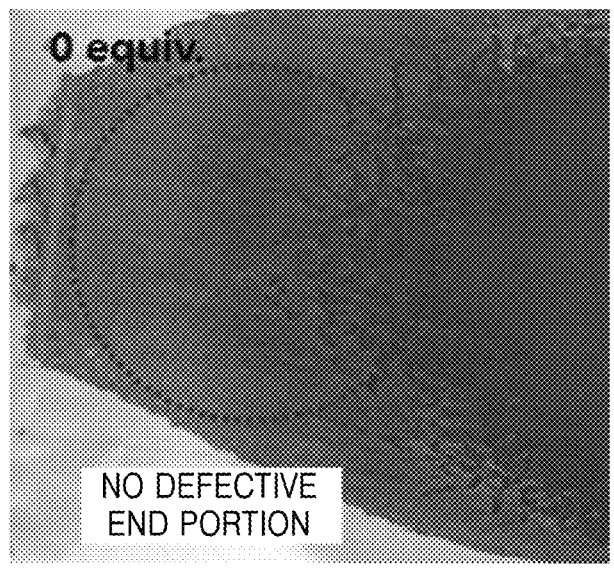

Whether the anodes manufactured using the binders of Examples 1, 8 and 9 and Comparative Example 2 had a defective end portion or not was visually evaluated. The evaluation results are shown in Table 4 and FIGS. 3 to 5. FIGS. 3 to 5 are images showing whether end portions of the anodes manufactured using the binders of Examples 2 and 8 and Comparative Example 2, respectively, are defective or not.

Referring to FIG. 5, the anode manufactured using the binder of Comparative Example 2 was found to have a defective end portion. In comparison, the anodes manufactured using the binders of Examples 1 and 8 were found to have no defective end portion, unlike the anode using the binder of Comparative Example 2. From these results, it was found that no defect occurred in end portions of anodes using any of the binders of Examples 1 and 8, due to suppressed bubble generation in an electrode active material composition. In Table 4, "○" indicates that there is no defective end portion, and "Δ" indicates that there is almost no defective end portion. Also, "X" indicated defective end portion.

TABLE 4

| Example | Amount of LiOH (with respect to 1 mole of AA) | Workability Defective end portion | Surface bubble | Physical properties of anode Adhesive strength (gf/mm) | Cohesion strength (gf/mm) | Charge-discharge characteristics of coin half cell Initial efficiency (%) (0.1 C) | Discharge capacity (mAh/c) (0.1 C) | CRR (%) |
|---|---|---|---|---|---|---|---|---|
| Example 1 | 1 mole | ○ | ○ | 1.0 | 11.3 | 89.6 | 466 | 94.7 |
| Example 8 | 2 moles | ○ | ○ | 1.3 | 12.4 | 89.5 | 527 | 88.6 |
| Example 9 | 0.5 mole | Δ | ○ | 1.2 | 9.8 | 89.4 | 463 | 86.3 |
| Comparative Example 2 | 0 mole | X | X | 0.4 | 6.1 | 88.1 | 498 | 75.7 |

Referring to Table 4, the anodes obtained using the binders of Examples 1, 8, and 9 were found to have improved adhesive strengths and cohesive strengths, as compared with those of the anode using the binder of Comparative Example 2. The coin half cells including the anodes obtained using the binders of Examples 1, 8, and 9 were found to have improved lifetime characteristics (CRR characteristics) as compared with those of the coin half cell including the anode obtained using the binder of Comparative Example 2.

Examples 10-18 and Comparative Example 3: Evaluation with Different Amounts of Hydroxide and Calcium Salt Physical properties of anodes using binders including different amounts of lithium hydroxide and calcium salt, and charge-discharge characteristics of lithium batteries including the anodes were analyzed.

The binders of Examples 10-18 and Comparative Example 3 were prepared in the same manner as in Example 1, except that the compositions of the binders were changed as represented in Table 5.

TABLE 5

| Example | Mixed weight ratio of PVA to AA | Amount of octanoic acid (with respect to 100 parts by weight of a total weight of PVA and AA) | Amount of LiOH (with respect to 1 mole of AA) | Amount of calcium salt (with respect to 1 mole of AA |
|---|---|---|---|---|
| Comparative Example 3 | 8:2 | 5 | 0 | 0 |
| Example 10 | 8:2 | 5 | 0 | 0.3 |
| Example 11 | 8:2 | 5 | 1 | 0 |
| Example 12 | 8:2 | 5 | 1 | 0.1 |
| Example 13 | 8:2 | 5 | 1 | 0.2 |
| Example 14 | 8:2 | 5 | 1 | 0.3 |
| Example 15 | 8:2 | 5 | 2 | 0 |
| Example 16 | 8:2 | 5 | 2 | 0.05 |
| Example 17 | 8:2 | 5 | 2 | 0.1 |
| Example 18 | 8:2 | 5 | 2 | 0.15 |

The anodes were manufactured in the same manner as described in Evaluation Example 1 with the binders of Examples 10-18 and Comparative Example 3, respectively. The lithium batteries (coin half cells) were manufactured in the same manner as described in Evaluation Example 2. The physical properties of the anodes were evaluated. The evaluation results are shown in Table 6.

TABLE 6

| Example | Amount of LiOH (mole) | Amount of calcium salt (mole) | Physical properties of anode Adhesive strength (gf/mm) | Cohesive strength (gf/mm) |
|---|---|---|---|---|
| Comparative Example 3 | 0 | 0 | 0.5 | 5.5 |
| Example 10 | 0 | 0.3 | 1.9 | 7.7 |
| Example 11 | 1 | 0 | 1.2 | 9.2 |
| Example 12 | 1 | 0.1 | 1.7 | 9.6 |
| Example 13 | 1 | 0.2 | 2.0 | 13.7 |
| Example 14 | 1 | 0.3 | 1.7 | 13.5 |
| Example 15 | 2 | 0 | 1.6 | 11.7 |
| Example 16 | 2 | 0.05 | 1.7 | 13.1 |
| Example 17 | 2 | 0.1 | 2.0 | 13.3 |
| Example 18 | 2 | 0.15 | 1.9 | 12.2 |

Referring to Table 6, the anodes including the binders of Examples 10-18 were found to have improved adhesive strengths and cohesive strengths, as compared with the anode including the binder of Comparative Example 3.

Examples 19-20 and Comparative Example 4: Evaluation with Different Amounts of Octanoic Acid Whether bubbles were generated or not in anode active material compositions including binders with different amounts of octanoic acid, physical properties of the binders, and charge-discharge characteristics of lithium batteries including the binders were analyzed.

The binders of Examples 19-20 and Comparative Example 4 were prepared in the same manner as in Example 1, except that the amount of octanoic acid was varied as represented in Table 7.

TABLE 7

| Example | Mixed weight ratio of PVA to AA | Amount of octanoic acid (parts by weight with respect to 100 parts by weight of a total weight of PVA and AA) | Amount of LiOH (with respect to 1 mole of AA) | Amount of calcium salt (with respect to 1 mole of AA) |
|---|---|---|---|---|
| Comparative Example 4 | 8:2 | 0 | 1 | 0.2 |
| Example 19 | 8:2 | 2.5 | 1 | 0.2 |
| Example 20 | 8:2 | 5 | 1 | 0.2 |

Anodes were manufactured in the same manner as described in Evaluation Example 1 with the binders of Examples 19 and 20 and Comparative Example 4, respectively, and whether an end portion of each of the anodes was defective or not was visually evaluated. After manufacturing the anodes and coin half cells in the same manner as in Evaluation Example 1 and Evaluation Example 2, respectively, physical properties of the anodes and charge-discharge characteristics of the coin half cells were evaluated. The results are shown in Table 8. Whether or not bubbles were generated in each anode active material composition was visually observed. In Table 8, X indicates that bubbles were not generated, while ○ indicates that bubbles were generated.

TABLE 8

| Example | Amount of octanoic acid (parts by weight with respect to 100 parts by weight of a total weight of PVA and AA) | Whether surface bubbles were generated or not | Physical properties of anode Adhesive strength (gf/mm) | Cohesive strength (gf/mm) | Charge-discharge characteristics of coin half cell Initial efficiency (%) (0.1 C) | Discharge capacity (mAh/g) (0.1 C) | CRR (%) |
|---|---|---|---|---|---|---|---|
| Example 19 | 2.5 | X | 1.4 | 15.3 | 89.4 | 515 | 92 |
| Example 20 | 5 | X | 1.5 | 14.5 | 89.3 | 517 | 92.8 |
| Comparative Example 4 | 0 | ○ | 1.4 | 14.3 | 89 | 512 | 92.7 |

Referring to Table 8, it was found that bubbles were not generated on a surface of the anode when the binders of Examples 19 and 20 were used, unlike when the binder of Comparative Example 4 was used, and adhesive and cohesive strengths of the anodes were improved. The coin half cells using the anodes including the binders of Examples 19 and 20 were found to have improved charge and discharge characteristics.

Example 1 and Comparative Examples 5-9: Comparison of Phase Separation Characteristics of Anode Active Material Composition, Physical Properties of Anode, and Charge-Discharge Characteristics of Battery (Coin Half Cell)

Phase separation characteristics of anode active material compositions using the binders of Example 1 and Comparative Examples 5-9, physical properties of the anodes including the binders, and charge-discharge characteristics of the batteries (coin cells) using the binders were compared.

Example 21

An anode and a coin half cell were manufactured in the manner as described in Evaluation Example 1 and Evaluation Example 2, respectively, with the binder of Example 1.

Comparative Example 5

A binder was prepared by mixing styrene butadiene rubber (SBR) and carboxymethyl cellulose (CMC) in a weight ratio of about 2.5:1.5. An anode and a coin half cell were manufactured in the same manner as in Evaluation Example 1 and Evaluation Example 2, respectively, with the binder.

Comparative Example 6

A binder was prepared by mixing polyvinyl alcohol and polyacrylic acid (weight average molecular weight (Mw)= 450,000 Da, Aldrich) in a weight ratio of about 8:2. An anode and a coin half cell were manufactured in the same manner as in Evaluation Example 1 and Evaluation Example 2, respectively, with the binder.

Comparative Example 7

A binder was prepared with polyvinyl alcohol. An anode and a coin half cell were manufactured in the same manner as in Evaluation Example 1 and Evaluation Example 2, respectively, with the binder.

Comparative Example 8

A binder was prepared with lithium polyacrylate. An anode and a coin half cell were manufactured in the same manner as in Evaluation Example 1 and Evaluation Example 2, respectively, with the binder.

Comparative Example 9

A binder was prepared with polyacrylic acid. An anode and a coin half cell were manufactured in the same manner as in Evaluation Example 1 and Evaluation Example 2, respectively, with the binder.

Phase separation characteristics of anode active material compositions including the binder used in Example 21 and the binders used in Comparative Examples 5 to 9, respectively, physical properties of the anodes, and charge-discharge characteristics of the batteries (coin half cells) were evaluated. The results are shown in Table 9.

In Table 9, when the anode slurry, i.e., the anode active material composition, was turbid, phase separation was deemed to have occurred and this was indicated by "○." When the anode slurry was a transparent solution, phase separation was deemed not to have occurred and this was indicated by "X."

TABLE 9

| Characteristics | Example 21 | Comparative Example 5 | Comparative Example 6 | Comparative Example 7 | Comparative Example 8 | Comparative Example 9 |
|---|---|---|---|---|---|---|
| Initial efficiency (%) | 89.5 | 86.7 | 87.6 | 86.3 | 88.8 | 86.4 |

TABLE 9-continued

| Characteristics | Example 21 | Comparative Example 5 | Comparative Example 6 | Comparative Example 7 | Comparative Example 8 | Comparative Example 9 |
|---|---|---|---|---|---|---|
| Lifetime (%) | 92.7 | 81.9 | 84.5 | 89.9 | 87.2 | 88.5 |
| Discharge capacity (mAh/g, @ 0.1 C) | 512 | 526 | 519 | 512 | 520 | 513 |
| Generation of bubbles | X | small | large | — | — | — |
| Phase separation in slurry | X | ○ | ○ | — | — | — |
| Cohesive strength of anode (gf/mm) | 1.4 | 0.9 | 0.5 | 0.5 | 0.7 | 0.2 |
| Adhesive strength of anode (gf/mm) | 14.6 | 2.1 | 4.7 | 2.0 | 1.2 | 5.8 |

Referring to Table 9, it was found that neither phase separation of the anode slurry nor bubble generation did occur when the binder used in Example 1 was used, unlike when the binders used in Comparative Examples 5 to 9 were used. The cohesive and adhesive strengths of the anode and the charge-discharge characteristics of the coin half cell were improved when the binder used in Example 1 was used, as compared with when the binders used in Comparative Examples 5 to 9 were used.

As described above, according to the one or more embodiments, cohesive and adhesive strengths of an electrode may be improved by using a binder according to any of the embodiments which suppresses bubble generation. A lithium battery using the electrode may have improved initial efficiency, lifetime characteristics and electrode stability. A volume change may also be suppressed in the lithium battery.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present description as defined by the following claims.

What is claimed is:

1. A binder comprising a metal salt of a graft copolymer, which is a polymerization product of polyvinyl alcohol, an ethylenically unsaturated carboxylic acid, and a polymerizable monomer having a long-chain alkyl group,
   wherein the binder is a copolymer comprising a first repeating unit represented by Formula 1, a second repeating unit represented by Formula 2 or Formula 2a, and a third repeating unit represented by Formula 3:

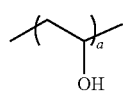

Formula 1

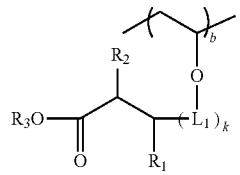

Formula 2

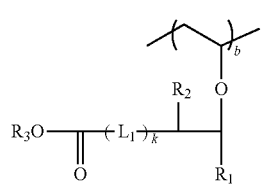

Formula 2a wherein, in Formula 2 or Formula 2a,
R$_1$ and R$_2$ are each independently hydrogen or a substituted or unsubstituted C1-C30 alkyl group,
R$_3$ is hydrogen, a monovalent metal, a divalent metal, a trivalent metal, or a combination thereof,
L$_1$ as a linker is a simple chemical bond, a C1-C30 alkylene group, or a C6-C30 arylene group, and
k is 0 or a number from 1 to 10,

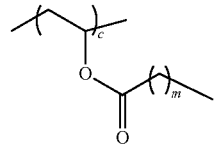

Formula 3 wherein, in Formula 3,
m is a number from 3 to 20, and
wherein in Formulae 1 to 3, a, b, and c are mole fractions of the first, second, and third repeating units, respectively, and are each independently a number from 0.01 to 0.99; provided that the sum of a, b, and c is 1.

2. A binder comprising a metal salt of a graft copolymer, which is a polymerization product of polyvinyl alcohol, an ethylenically unsaturated carboxylic acid, and a polymerizable monomer having a long-chain alkyl group, wherein the binder further comprises another graft copolymer of the polyvinyl alcohol, the ethylenically unsaturated carboxylic acid, and the polymerizable monomer having a long-chain alkyl group.

3. The binder of claim 1, wherein the ethylenically unsaturated carboxylic acid is a compound represented by Formula 1a:

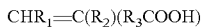  Formula 1a wherein, in Formula 1a,
$R_1$ is hydrogen, a substituted or unsubstituted C1-C30 alkyl group, a substituted or unsubstituted C6-C30 aryl group, or —COOH,
$R_2$ is hydrogen, a substituted or unsubstituted C1-C30 alkyl group, a substituted or unsubstituted C6-C30 aryl group, or —$(CH_2)_a$COOH wherein a is a number from 1 to 10, and
$R_3$ is a simple chemical bond, a C1-C30 alkylene group, or a C6-C30 arylene group.

4. The binder of claim 1, wherein the ethylenically unsaturated carboxylic acid is at least one selected from methacrylic acid, acrylic acid, itaconic acid, fumaric acid, crotonic acid, 2-ethyl acrylic acid, 2-pentenoic acid, trans-2-methyl-2-butenoic acid, and trans-2,3-dimethylacrylic acid.

5. The binder of claim 1, wherein the polymerizable monomer having a long-chain alkyl group is pentanoic acid, octanoic acid, hexanoic acid, heptanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, neodecanoic acid, 2,2-dimethyloctanoic acid, or a mixture thereof.

6. The binder of claim 1, wherein the binder comprises at least one additional monomer selected from a polymerizable monomer having a thiol group, a polymerizable monomer having a silane group, and a polymerizable monomer having an alkylene oxide group.

7. The binder of claim 6, wherein
the polymerizable monomer having a thiol group is HS—$(CH_2)_n$—COOH wherein n is a number from 1 to 20,
the polymerizable monomer having a silane group is $(R_1)(R_2)(R_3)$Si—$(CH_2)_n$—COOH wherein n is a number from 1 to 20, and $R_1$ to $R_3$ are each independently hydrogen, a C1-C30 alkyl group, or a C6-C30 aryl group, and
the polymerizable monomer having an alkylene oxide group is glycidyl methacrylate, glycidyl acrylate, allyl glycidyl ether, or a combination thereof.

8. The binder of claim 1, wherein a metal of the metal salt is a monovalent metal, a divalent metal, a trivalent metal, or a combination thereof.

9. The binder of claim 1, wherein a metal of the metal salt is lithium (Li), magnesium (Mg), calcium (Ca), sodium (Na), potassium (K), aluminum (Al), cobalt (Co), or a combination thereof.

10. The binder of claim 1, wherein the binder further comprises at least one selected from a fourth repeating unit represented by Formula 4 and a fifth repeating unit represented by Formula 5:

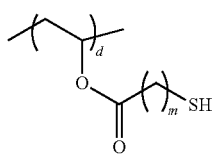  Formula 4 wherein, in Formula 4,
m is a number from 1 to 20, and
d is a number from 0.01 to 0.99, and

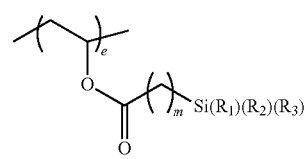  Formula 5 wherein, in Formula 5,
m is a number from 1 to 20, $R_1$ to $R_3$ are each independently hydrogen, a C1-C30 alkyl group, or a C6-C30 aryl group, and
e is a number from 0.01 to 0.99.

11. The binder of claim 1, wherein the binder is a graft copolymer comprising a repeating unit represented by Formula 1, a repeating unit represented by Formula 2-1, and a repeating unit represented by Formula 3; or
a graft copolymer comprising a repeating unit represented by Formula 1, a repeating unit represented by Formula 2-1, a repeating unit represented by Formula 2-2, and a repeating unit represented by Formula 3:

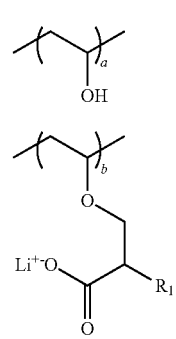  Formula 1

Formula 2-1 wherein, in Formula 2-1,
$R_1$ is hydrogen, or a substituted or unsubstituted C1-C30 alkyl group,

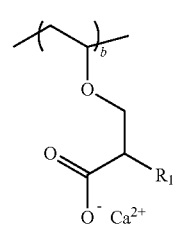  Formula 2-2 wherein, in Formula 2-2,
$R_1$ is hydrogen, or a substituted or unsubstituted C1-C30 alkyl group,

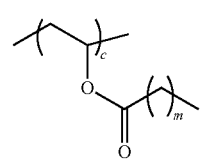  Formula 3 wherein, in Formula 3,
m is a number from 4 to 20, and
in Formulae 1, 2-1, 2-2, and 3,
a, b, and c are mole fractions of the corresponding repeating units, respectively, and are each independently a number from 0.01 to 0.99, provided that the sum of a, b, and c is 1.

12. The binder of claim 1, wherein the binder is a graft copolymer represented by Formula 6 or a graft copolymer represented by Formula 7:

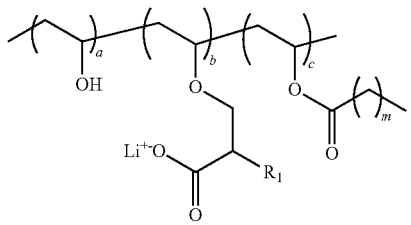

Formula 6 wherein, in Formula 6,
a, b, and c are each independently a number from 0.01 to 0.99, provided that the sum of a, b, and c is 1, and
m is a number from 3 to 20,
$R_1$ is hydrogen or a substituted or unsubstituted C1-C30 alkyl group,

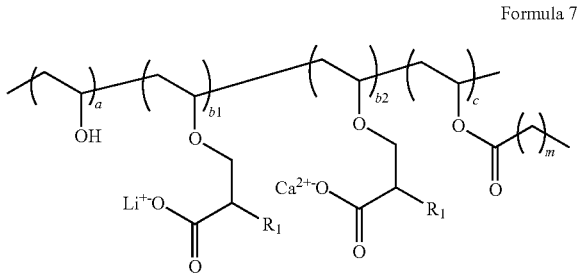

Formula 7 wherein, in Formula 7,
a, b1, b2 and c are each independently a number from 0.01 to 0.99, provided that the sum of a, b1, b2 and c is 1,
m is a number from 3 to 20,
$R_1$ is hydrogen or a substituted or unsubstituted C1-C30 alkyl group, and
the graft copolymer of Formula 7 is charge balanced.

13. The binder of claim 1, wherein a mixed weight ratio of the polyvinyl alcohol to the ethylenically unsaturated carboxylic acid is about 9:1 to about 1:9.

14. The binder of claim 1, wherein a mixed weight ratio of the polyvinyl alcohol to the ethylenically unsaturated carboxylic acid is about 9:1 to about 5:5.

15. A binder comprising a metal salt of a graft copolymer, which is a polymerization product of polyvinyl alcohol, an ethylenically unsaturated carboxylic acid, and a polymerizable monomer having a long-chain alkyl group, wherein
the metal salt comprises a lithium salt and a calcium salt, and
a mixed molar ratio of repeating units comprising the lithium salt to repeating units comprising the calcium salt is about 1:1 to about 5:1.

16. The binder of claim 1, wherein an amount of the polymerizable monomer having a long-chain alkyl group is about 0.1 parts to about 10 parts by weight with respect to 100 parts by weight of a total weight of the polyvinyl alcohol and the ethylenically unsaturated carboxylic acid.

17. An electrode for a secondary battery, wherein the electrode comprises the binder of claim 1 and an electrode active material.

18. The electrode of claim 17, wherein the electrode active material is at least one anode active material selected from a silicon-based active material, a tin-based active material, a silicon-tin alloy-based active material, and a silicon-carbon-based active material.

19. The electrode of claim 17, wherein
the electrode is obtained by coating and drying an electrode active material composition comprising the binder, the electrode active material, and a solvent; and
an amount of the binder is about 0.5 parts to about 15 parts by weight with respect to 100 parts by weight of the electrode active material composition.

20. The electrode of claim 19, wherein the electrode active material composition has a viscosity of less than 5,000 centipoise.

21. The electrode of claim 19, wherein the electrode active material composition further comprises at least one anti-foaming agent selected from ethanol, propanol, butanol, pentanol, hexanol, heptanol, octanol, nonanol, and decanol.

22. The electrode of claim 17, wherein the electrode has a cohesive strength of about 7 gram force per millimeter or greater, and an adhesive strength of about 1 gram force per millimeter or greater.

23. A secondary battery comprising a first electrode, a second electrode, and an electrolyte disposed between the first electrode and the second electrode, wherein the first electrode is the electrode of claim 17.

24. A method of preparing the binder according to claim 1, the method comprising:
performing a polymerization reaction of the polyvinyl alcohol, the ethylenically unsaturated carboxylic acid, and the polymerizable monomer having a long-chain alkyl group to obtain a graft polymerization reaction product; and
reacting the graft polymerization reaction product with a monovalent metal compound to prepare a monovalent metal salt of a graft copolymer.

25. The method of claim 24, further comprising reacting the monovalent metal salt of the graft copolymer with a divalent metal compound, a trivalent metal compound, or a combination thereof to thereby prepare a composite of the monovalent metal salt of the graft copolymer and a divalent metal salt, a composite of the monovalent metal salt of the graft copolymer and a trivalent metal salt, or a composite of the monovalent metal salt of the graft copolymer, a divalent metal salt, and a trivalent metal salt.

26. The method of claim 24, wherein
the monovalent metal compound is lithium hydroxide, sodium hydroxide, potassium hydroxide, or a combination thereof, and
an amount of the monovalent metal compound is about 0.5 moles to about 3.0 moles with respect to 1 mole of the ethylenically unsaturated carboxylic acid.

27. The method of claim 25, wherein
the divalent metal compound or the trivalent metal compound is calcium hydroxide, calcium acetate, magnesium acetate, cobalt nitrate hexahydrate, or aluminum acetylacetonate, and
an amount of the divalent metal compound or the trivalent metal compound is about 0.5 moles or less with respect to 1 mole of the ethylenically unsaturated carboxylic acid.

28. The method of claim 25, wherein a total amount of the monovalent metal compound and one selected from the divalent metal compound and the trivalent metal compound is about 1 mole to 3 moles with respect to 1 mole of the ethylenically unsaturated carboxylic acid.

* * * * *